(12) United States Patent
Wendt et al.

(10) Patent No.: US 11,349,676 B2
(45) Date of Patent: May 31, 2022

(54) POWER PROVIDING DEVICE AND METHOD, POWER RECEIVING DEVICE

(71) Applicant: SIGNIFY HOLDING B.V., Eindhoven (NL)

(72) Inventors: Matthias Wendt, Würselen (DE); Lennart Yseboodt, Retie (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 797 days.

(21) Appl. No.: 15/741,309

(22) PCT Filed: Jun. 13, 2016

(86) PCT No.: PCT/EP2016/063504
§ 371 (c)(1),
(2) Date: Jan. 2, 2018

(87) PCT Pub. No.: WO2017/001179
PCT Pub. Date: Jan. 5, 2017

(65) Prior Publication Data
US 2018/0375673 A1    Dec. 27, 2018

(30) Foreign Application Priority Data

Jun. 30, 2015  (EP) .................................... 15174638

(51) Int. Cl.
*G06F 1/26*     (2006.01)
*H04L 12/10*    (2006.01)
(Continued)

(52) U.S. Cl.
CPC .............. *H04L 12/10* (2013.01); *G06F 1/189* (2013.01); *G06F 1/26* (2013.01); *H04L 12/40045* (2013.01)

(58) Field of Classification Search
None
See application file for complete search history.

(56) References Cited

U.S. PATENT DOCUMENTS 7,593,747 B1 * 9/2009 Karam .................. G06F 1/3203
455/522
8,930,729 B1   1/2015 Fifield et al.
(Continued)

FOREIGN PATENT DOCUMENTS

CN    101124773 A    2/2008
CN    101147356 A    3/2008
(Continued)

OTHER PUBLICATIONS

Fu et al, Power Sourcing Equipment Chip, and power over Ethernet device and method, 2016, English Translation, China. (Year: 2016).*
(Continued)

*Primary Examiner* — Fahmida Rahman

(57) ABSTRACT

The invention relates to a power providing device (1), a power receiving device (2) and a corresponding method of providing power from a power providing device (1) to multiple power receiving devices (2) allowing for a reduction of the power consumed in stand-by situations. The invention provides for a distribution system allowing for providing standby assistance low voltage allowing for increased efficiency operation.

13 Claims, 8 Drawing Sheets

(51) Int. Cl.
*H04L 12/40* (2006.01)
*G06F 1/18* (2006.01)

(56) References Cited

U.S. PATENT DOCUMENTS

| | | | |
|---|---|---|---|
| 9,377,794 B1* | 6/2016 | Dwelley | G05F 1/462 |
| 10,466,768 B2* | 11/2019 | Fu | H04L 12/10 |
| 2010/0114389 A1 | 5/2010 | Chatterton et al. | |
| 2012/0060042 A1 | 3/2012 | Buhari et al. | |
| 2012/0109340 A1 | 5/2012 | Vezza et al. | |
| 2015/0019884 A1* | 1/2015 | Huff | H04L 12/10 |
| | | | 713/300 |
| 2015/0244535 A1* | 8/2015 | Chen | H04L 12/40045 |
| | | | 713/300 |
| 2016/0269187 A1* | 9/2016 | Zhuang | H04L 12/10 |
| 2016/0349781 A1 | 12/2016 | Van Endert | |

FOREIGN PATENT DOCUMENTS

| | | |
|---|---|---|
| CN | 105634750 * | 6/2016 |
| GN | 102123034 A | 7/2011 |
| JP | 2013540333 A | 10/2013 |
| JP | 2014115031 A | 6/2014 |
| WO | 2013107015 A1 | 7/2013 |
| WO | 2014027277 A2 | 2/2014 |

OTHER PUBLICATIONS

Texas Instruments, "LM5070 Integrated Power Over Ethernet PD Interface and PWM Controller," SNVS308G, Oct. 2004, Revised Apr. 2013, LM5070, www.ti.com, Texas Instruments Incorporated (24 Pages).

* cited by examiner

POWER PROVIDING DEVICE AND METHOD, POWER RECEIVING DEVICE

CROSS-REFERENCE TO PRIOR APPLICATIONS

This application is the U.S. National Phase application under 35 U.S.C. § 371 of International Application No. PCT/EP2016/063504, filed on Jun. 13, 2016, which claims the benefit of European Patent Application No. 15174638.5, filed on Jun. 30, 2015. These applications are hereby incorporated by reference herein.

FIELD OF THE INVENTION

The invention relates to a power providing device for providing power to multiple power receiving devices, such power receiving device, a system comprising such power providing device and such power receiving device and a method of providing power from a power providing device to a power receiving device. In particular, but not limited thereto, the invention may be implemented in the context of Power over Ethernet according to standards IEEE 802.3af or IEEE 802.3at and following or related standards like IEEE 802.3bt.

BACKGROUND OF THE INVENTION

In WO 2013/107015 A1 a method in a power management module for supervision of a Power Sourcing Equipment, PSE, and a power management module adapted to supervise a PSE is provided. The PSE is adapted to provide power on an Ethernet cable. The power management module is connected to an Ethernet physical layer and a power source module within the PSE. The method comprises detecting a change in a power providing mode of the power source module. When the detected change indicates that the power source module has stopped to provide power, the method comprises switching off the Ethernet physical layer. When the detected change indicates that the power source module has started to provide power, the method comprises switching on the Ethernet physical layer Standards related to Power over Ethernet include, as mentioned above, IEEE 802.3af and IEEE 802.3at. Work is currently done on a further standard IEEE 802.3bt. In the context of Power over Ethernet (PoE), systems are provided where a Power Sourcing Equipment (PSE or PSE device) with multiple ports is supplying a number of powered device (PDs). Depending on the use of the system, the PDs may be often idling. During idling they do not consume their nominal power but only a fraction, the so called stand-by power. Such PDs may be light sources, but also other loads like sensors or actuators.

Stand-by situations are system states with no substantial load. Even though the power consumption provided by an active load might be eliminated, there is still a desire for further improving the energy consumption of the overall system.

Preferably, an improvement as to the power consumption also in a stand-by state may still be compatible with existing system, in order to avoid a need for completely replacing existing equipment.

SUMMARY OF THE INVENTION

It is an object of the present invention to provide a power providing device, a power receiving device and a corresponding method of providing power from a power providing device to multiple power receiving devices allowing for a reduction of the power consumed in stand-by situations.

In a first aspect of the present invention a power providing device arranged for providing power to multiple power receiving devices is presented, comprising a power supply unit configured to supply power to a power receiving device at a first voltage and at a second voltage, the first voltage being higher than the second voltage, the first voltage corresponding to a first mode of the power receiving device and the second voltage corresponding to a second mode of the power receiving device, wherein the power providing device is configured such that the second voltage is supplied after the power supply unit provided power to the power receiving device at the first voltage.

In a second aspect of the present invention, a power receiving device arranged for being provided with power by a power providing device is presented, comprising a power receiving unit configured to receive power from the power providing device at a first voltage and at a second voltage, the first voltage being higher than the second voltage, and a power reception control unit configured to control the power receiving device to operate in a first mode and in a second mode, wherein the power reception control unit is configured to control the power receiving device to operate in the first mode upon receiving power at the first voltage and is further configured to control the power receiving device to switch from operating in the first mode to operating in the second mode upon receiving power at the second voltage after receiving power at the first voltage.

In a further aspect of the present invention, a method of providing power from a power providing device to a power receiving device is presented, the power providing device being arranged for providing power to multiple power receiving devices, the power receiving device being arranged to operate in a first mode and in a second mode, the method comprising the steps of supplying power, by the power providing device, at a first voltage, receiving power, by the power receiving device, at the first voltage, supplying power, by the power providing device, at a second voltage, after supplying power at the first voltage, the first voltage being higher than the second voltage, and receiving power, by the power receiving device, at the second voltage, wherein the power receiving device is operating in the first mode upon receiving power at the first voltage and switches to from operating in the first mode to operating in the second mode upon receiving power at the second voltage after receiving power at the first voltage.

It was realized that, as the supply voltage, for example in PoE, is about or beyond 50V and the microcontroller and communication circuitry active throughout these idle (or stand-by) situations have typically a supply voltage of 3-5 V, a relatively ineffective supply for this idle situations takes places if consideration is given only to the power (namely by adjusting the current). In addition the PSE mains supply will not perform efficiently in this mode if all ports are idling. A main power supply will operate in a very unfavorable point of operation where the efficiency easily drops below 10%.

Specifically in the context of PoE (even though the invention equally applies to other approaches for supplying or providing power to multiple power receiving devices), the invention is related to an approach using a distinct PoE bus voltage jump to a standby value above $V_{reset}$ but below the normal operational voltage range of PoE. This may provide a means for increasing stand-by efficiency as well as promoting PDs into sleep mode as initiated by the PSE. In the stand-by or sleep mode the PSE allows the PD(s) a certain maximum power, which preferably also includes a reserve for potential cable losses.

The mechanism according to the invention may be enabled by means of special commands towards PoE components. The mechanism is preferably backward compatible in terms that non aware PDs will get switched of and will get powered up anew (new identification, classification cycles) when stand-by ends.

In a preferred embodiment, the power providing device is arranged to be coupled to the power receiving device by means of a first set of conductors and a second set of conductors, wherein the power supply unit is configured to supply power to the power receiving device at the first voltage using the first set of conductors and at the second voltage using the second set of conductors.

The use of dedicated sets of conductors for separately (or cooperatively) providing power allows for increased conversion efficiency (mains to specific desired voltage), while possibly avoiding a need for additional circuitry for switching the power supply. In case the second set of conductors is always provided with the second voltage, the power receiving device may be specifically adapted, taking into account the dedicated supply.

In a preferred modification of the above embodiment, the power supply unit is configured to supply power to the power receiving device using the second set of conductors selectively either at the first voltage or at the second voltage.

Rather than always using the second set of conductors for supplying power at the second voltage, a switching allows for using the second set of conductors also for providing "regular" power, so the total amount of power to be provided may be increased by using the first voltage on both sets of conductors.

In another preferred modification of the above embodiment, the power supply unit is configured to supply power to the power receiving device at a third voltage using the second set of conductors, the third voltage being lower than the first voltage, such that a difference between the first and the third voltage corresponds to the second voltage, allowing power to be supplied using the difference between the first voltage and the third voltage.

It is not necessary that the second voltage as such is present on the conductors used for supplying power, as also a voltage difference between the different sets of conductors may be used of obtaining the second voltage at the side of the power receiving device.

In a corresponding preferred embodiment, the power receiving device is arranged to be coupled to the power providing device by means of a first set of conductors and a second set of conductors, wherein the power receiving unit is configured to receive power from the power providing device at the first voltage using the first set of conductors and at a third voltage using the second set of conductors, the third voltage being lower than the first voltage, such that a difference between the first and the third voltage corresponds to the second voltage, and to supply power to at least the power reception control unit based on the difference between the first and third voltage.

In a preferred embodiment, the power supply unit is configured to provide power to the power receiving device selectively either at the first voltage or at the second voltage.

A switchable power supply unit being able to provide both, the first and the second voltage, allows for a compact design of the power providing device.

In a preferred embodiment, the power supply unit includes a first power supply means for supplying power at the first voltage and a second power supply means for supplying power at the second voltage.

The use of separate power supply means gives the opportunity to design such power supply means such that the power conversion, e.g. from mains, may be provided in the most efficient way for the respective voltage.

In a preferred embodiment, the power providing device is arranged for disabling the first power supply means in case power is provided to all power receiving devices receiving power from the power providing device at the second voltage.

If only the provision of power at the second voltage is needed in a particular situation, the power supply means for the first voltage would be idling and may indeed be disabled, such avoiding unnecessary consumption of energy in such idling state.

In a preferred embodiment, the power providing device further comprises a power provision control unit arranged to control the power supply unit by switching between the first power supply means and the second power supply means.

In a preferred embodiment, a switching to stand-by mode, i.e. a switching from providing power at the first voltage to providing power at the second voltage is automatically initiated when the supply current taken by the power receiving device falls below a predefined/programmable threshold value.

In a preferred embodiment, a switching to stand-by mode is (automatically) initiated when the power providing device detects a command from a supervising control system that sends the power receiving device into idle or stand-by state. In such embodiment, the power providing device includes communication means at least for also receiving/detecting messages or commands send to one or more power receiving devices. Such sending may be done using the same connection which is also used for supplying power (e.g. an Ethernet cable in the case of PoE), while also other means of communication (e.g. wireless by radio transmission or some other way) may also be used, as will be appreciated by the skilled person.

In a preferred embodiment, the power providing device is arranged for checking, by means of the MPS, whether a legacy power receiving device (e.g. a PD which does not know about the stand-by mechanism as discussed here) is present. The power providing device may then be arranged not to restart a detection cycle but may be arranged to further monitor communication traffic to the power receiving device in order to detect commands which may end the power receiving device's idle or stand-by state. In such case, the power providing device is arranged to power the power receiving device up again and after a certain delay for letting the power receiving device boot the power providing device may resend the control message to the power receiving device.

In a preferred embodiment, the power providing device is provided externally, e.g. from the power receiving device or from some other source, with commands for its operation, e.g. by means of LLDP in the case of PoE.

In a preferred embodiment of the power receiving device, a power consumption of the power receiving device in the second mode is less than a power consumption of the power receiving device in the first mode, wherein the power reception control unit is configured to control the power receiving device to switch from operating in the second mode to operating in the first mode upon receiving power at the first voltage after receiving power at the second voltage.

In a preferred embodiment, a system is provided, comprising a power providing device according to the invention and a power receiving device according to the invention, wherein the power providing device is a power sourcing equipment according to a Power over Ethernet standard, wherein the power receiving device is a powered device according to the Power over Ethernet standard, wherein the first voltage is in the range of 42.5 to 57 V and the second voltage is in the range of 5.5 to 15.5 V, preferably in the range of 5.5 to 6.5 V.

In a further aspect of the present invention a computer program is presented for power providing device according to the invention, the computer program comprising program code means for causing the power providing device to carry out the steps of the method according to the invention relating to the power providing device when the software product is run on the power providing device.

In a further aspect of the present invention a computer program is presented for power receiving device according to the invention, the computer program comprising program code means for causing the power receiving device to carry out the steps of the method according to the invention relating to the power receiving device when the software product is run on the power receiving device.

It shall be understood that the power providing device of claim 1, the power receiving device of claim 9, the system including a power providing device and a power receiving device of claim 12, the method of providing power of claim 13, and the computer programs of claims 14 and 15 have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
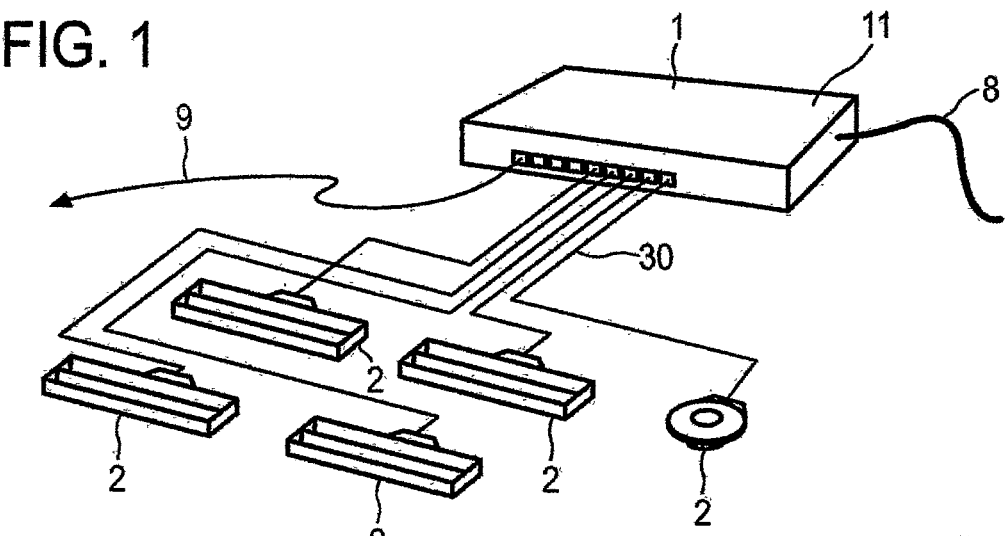
FIG. 1 shows an exemplary PoE lighting system with a PoE switch and a number of luminaires, FIG. 2 schematically shows functions blocks of a typical PoE connection.

FIG. 1 shows an exemplary PoE lighting system with a PoE switch and a number of luminaires.

A typical luminaire PD 2 (powered device, an example of a power receiving device) for a Power over Ethernet system (PoE system, an example of a system comprising a power providing device 1 and a power receiving device) comprises LED modules generating light and an electronic section controlling the LED current as well as interfacing to the PoE connection for negotiation and voltage adaptation. A typical sensor 2 (as another example of a power receiving device) mostly contains the interfacing to the PoE connection for negotiation and voltage adaptation and some sensor signal interfacing and communication means (not shown).

The power sourcing equipment 1 (PSE, as an example of a power providing device) is connected to a mains grid 8 for receiving power, to some communication counterpart (e.g. a control center, not shown) by means of a communication line 9 and to the PDs by means of Ethernet cables 30. The PSE 1 includes an internal PSE power supply unit (PSU) 11, coupled to the mains grid.

Figure 2:
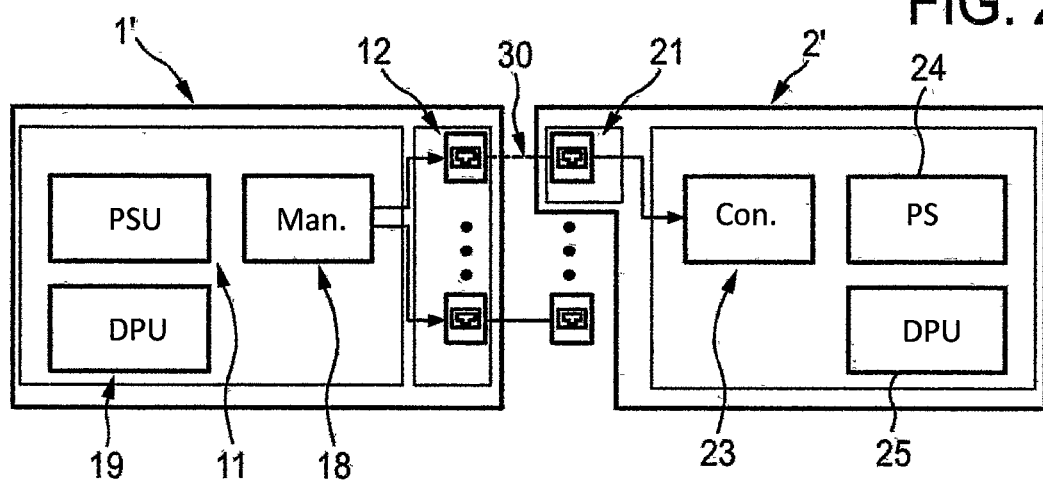

FIG. 2 schematically shows functions blocks of a typical PoE connection.

The PoE system shown in FIG. 2 includes the PSE 1' and one PoE load or PD 2'. The connection is provided by means of a so called (Ethernet) patch cable between one of the plurality 12 of output jacks (OJ) of the PSE 1' and an input jack 21 of the PD 2'. In PoE systems power supply and data connectivity are normally sharing the same patch cable 30.

The PSE 1' includes a PSE power supply unit 11', a PSE manager (Man.) 18 or control unit and a PSE network data processing unit (DPU) 19 or communication unit.

The PD 2' includes a PD controller (Con.) 23, a PD power supply (PS) 24 and a PD network data processing unit 25.

As the skilled person is well familiar with the basic structure and functionality of the elements of a conventional PSE or PD, further explanation is omitted.

Figure 3:
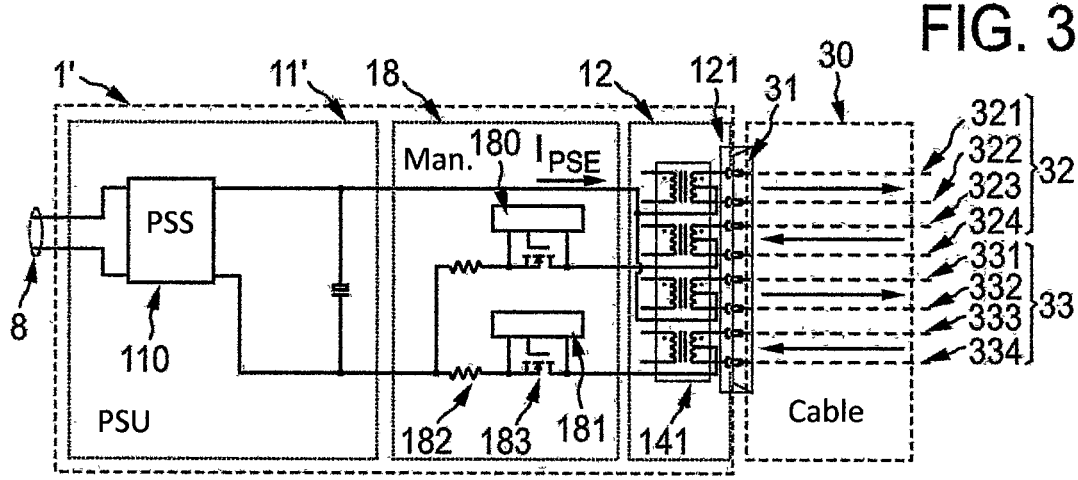
FIG. 3 shows a diagram illustrating a known power supply circuitry in a 4-pair PSE.

FIG. 3 shows a diagram illustrating a known power supply circuitry in a 4-pair PSE.

A circuitry of a known PSE power train for one channel is depicted in FIG. 3. The PSE power supply unit 11' in a conventional PSE 1' is relatively simple and shared by all channels. The power, typically coming from the mains grid 8, gets converted to the usual voltages of PoE (e.g. 50-57V) by means of a mains rectifier and power converter 110. Other voltages may also be generated for the internal use of the PSE 1'. The PSE manager 18 is only roughly sketched here as it is not subject of this invention. It typically comprises isolation switches 183, current monitoring shunts 182 and control circuitry 180, 181 for each pair set 32, 33 which identifies valid PD connected and negotiates power required by the PD. The control circuitry 180, 181 can be either implemented separately per each channel or shared by the channels and used for negotiation in a multiplex way. Coupling transformers 141 combine DC power and data to be available at the jack 121 of the PSE 1'. The PSE can at all-time remove PD power and is supposed to do so whenever a so-called minimum power signature (MPS) is no longer present. In order to repower a PD, the known PSE 1' always has firstly to initiate identification and classification in order to negotiate power with the PD 2' (see below).

The jack 121 includes a number of cable connectors 31, to each of which here a respective conductor 321, 322, 323, 324, 331, 332, 333, 334 of the pair sets 32, 33 of the cable 30 is coupled.

Figure 4:
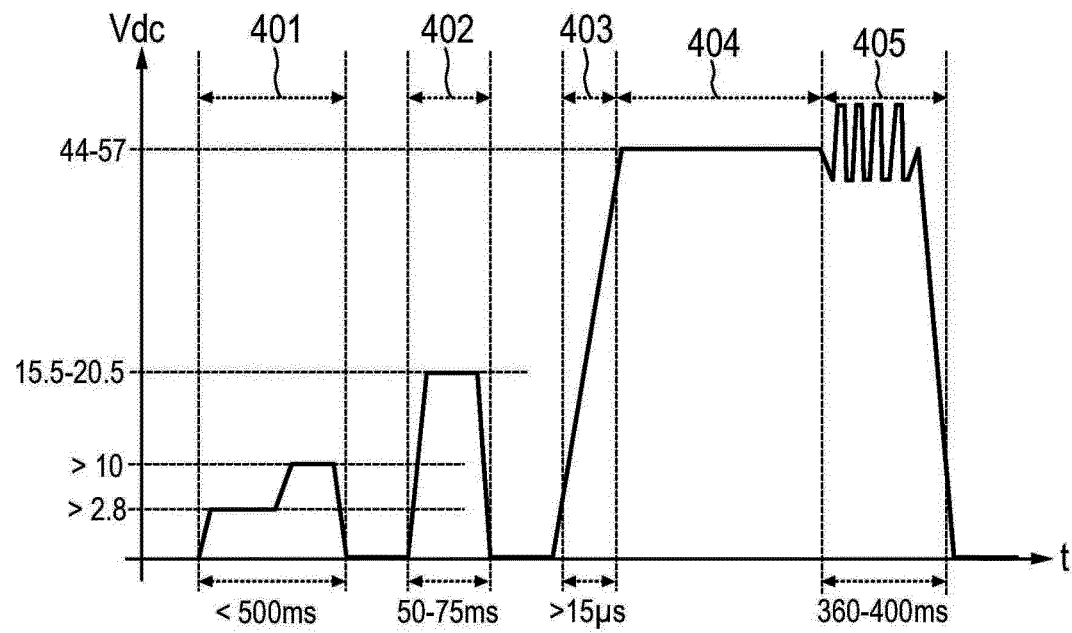
FIG. 4 shows a diagram illustrating PSE's voltages during a known PoE process.

FIG. 4 shows a diagram illustrating PSE's voltages during a known PoE process.

During an initial detection period 401, a voltage ranging from 2.8 V to 10 V is applied, so the PSE may detect the presence of any PDs, without endangering conventional (i.e. non-PoE) devices connected to the Ethernet. In case of successful detection, a classification period 402 with a voltage of 15.5 to 20.5 V is provided, eventually followed by a start-up period 403 and an operation period 404, where the operational power in the range of 44 to 57 V is provided by the PSE to the respective PD. In the disconnect period 405, here an AC disconnect is shown, even though a DC disconnect is much more common. After the disconnect, the whole process may be repeated.

Figure 5:
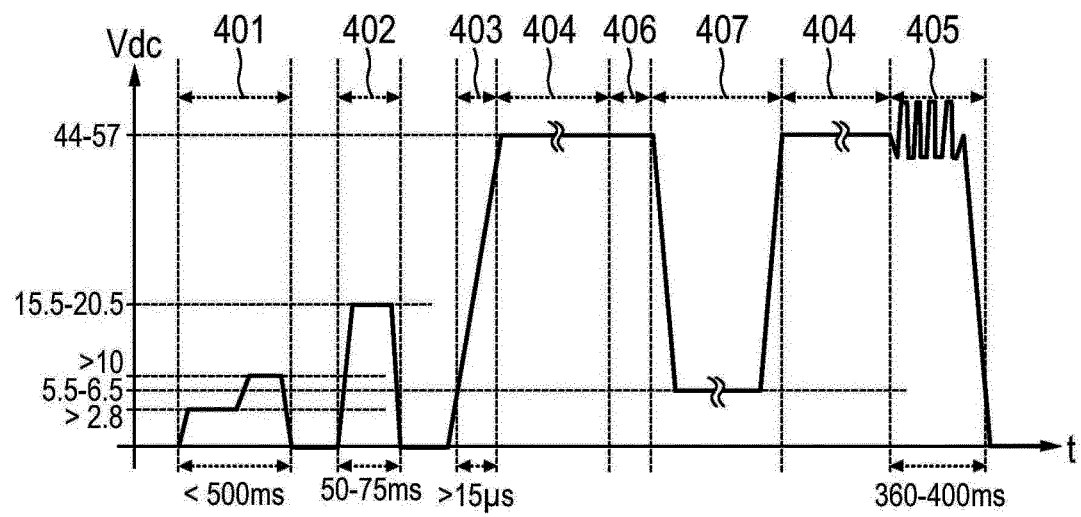
FIG. 5 shows a diagram illustrating PSE's voltages during a PoE process in accordance with an embodiment of the invention including a stand-by, FIG. 6 shows a diagram illustrating a power supply circuitry in a PSE in accordance with another embodiment of the invention.

FIG. 5 shows a diagram illustrating PSE's voltages during a PoE process in accordance with an embodiment of the invention including a stand-by, In terms of the detection period 401, the classification period 402, the start-up period 403 and the (first) operation period 404, the diagram shown in FIG. 5 corresponds to that shown in FIG. 4. Differing to the case of FIG. 4, a stand-by is triggered in the case of FIG. 5, where, after an idle lockout period 406, the voltage provided by the PSE to the PD is reduced into the range of 5.5 to 6.5 V in a stand-by period 407. After the stand-by period 407, the operation is resumed in a further operation period 404, eventually followed by a disconnection period 405 as discussed above.

Shown in the voltage curve of FIG. 5 is that the PD voltage gets reduced to a low value voltage at about 10% of the nominal PoE supply voltage. This can be chosen, as depicted, to be between 5.5 and 6.5 V. This range provides a good value to generate the internal microcontroller (µC) supply in the PD with low effort.

The voltage range of 5.5 to 6.5 V is chosen in a way that unaware legacy PDs will simply switch off due to undervoltage lockout and wait for the next detection cycle. The reduced voltage range is preferably below 10V (the maximum detection voltage), such that damage may be excluded if the stand-by state is applied to PDs or Ethernet devices that are unaware of this stand-by mechanism. It is known that the detection voltage of 10 V can be handled by any Ethernet device without damage, while higher voltages have the possibility to cause damage. Already known PDs can handle any voltage, but typically consume large amounts of power when they are in the classification voltage range of 15.5 to 20.5 volt. This range is preferably avoided as stand-by voltage.

A PD according to the present invention may still keep the MPS generation circuitry intact (i.e. operative) and in this way signals to the PSE that it is still connected and active.

An idle lock-out period 406 is provided. After the PSE knows that the PD is going into stand-by it still keeps the normal supply VPoE during the idle lock-out period 406 in case the idling is shorter than this lockout time. This reduces unnecessary frequent changes of the supply voltage level.

Figure 6:
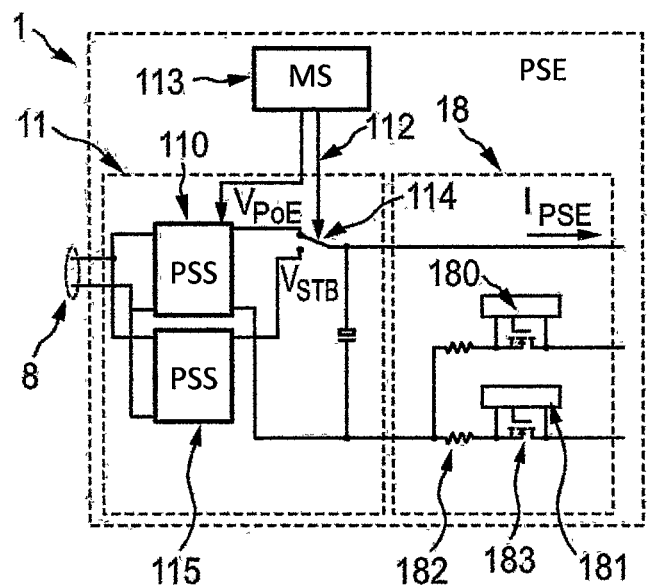

FIG. 6 shows a diagram illustrating a power supply circuitry in a PSE in accordance with another embodiment of the invention, The PSE 1 shown in FIG. 6 as a first example of a power providing device according to the invention includes several of the elements discussed with respect to FIGS. 2 and 3.

Specifically, while the PSE 1, similar to the PSE 1' shown in FIG. 3, also includes a connection to mains grid 8, a control unit 18 (or PSE manager) (including control circuitry 180, 181, current monitoring shunts 182 and isolation switches 183) and a plurality of jacks for connection of Ethernet cables (not shown), the PSE 1 includes a power supply unit 11 differing from that (11') shown in FIG. 3 and additionally includes a stand-by management system (MS) 113 as an example of a power provision control unit.

Here, as basically throughout all illustrations, circuitry for only one connection or cable, i.e. for one power receiving device, is shown, while it will be appreciated that in a practical realization a more complicated circuitry is provided, so power may be provided to plural power receiving device in parallel.

The PSE 1' as shown in FIG. 6 comprises, a parts of the power supply unit 11, two power supply sections 110, 115: firstly a power supply section (PSS) 110 corresponding to the conventional power supply section 110 shown in FIG. 3, which is able to supply all PSE loads in active operation with $V_{PoE}$; and secondly there is provided a separate power supply section 115 for stand-by operation, supplying the stand-by voltage level $V_{STB}$. A switching means 114 allows selecting either voltage source 110, 115 to be connected to the PoE output. The switching means 114 gets controlled by the stand-by management system 113 by means of a signal line 112.

In a preferred embodiment, the PD (not shown in FIG. 3) has a detection means that monitors the PoE supply voltage. When this voltage falls below the standby threshold (e.g. below 6.5 V) the PD supply circuitry deactivates any high power loads, or loads that cannot work with the lower supply voltage. A linear low drop regulator can be beneficially used generating all internal supply during stand-by. It is also possible the PD has an auxiliary supply that is capable of both handling full PoE voltage ($V_{PoE}$ in the range of 42.5 to 57 V) as well as the lower voltage (e.g. in the range of 5.5 to 6.5 V). In this way the losses in the PD get minimized.

It is clear that the power supplied by a stand-by supply is limited and hence only low power functionality in the PD can be enabled.

Other PDs with low power consumption like sensors may also be designed in order to fully operate also at the stand-by voltage.

Whenever the standby mode gets disabled in the PSE, the PD can switch back to nominal PoE supply voltage ($V_{PoE}$) and, for example in the case of the PD being a luminaire, the lamp driver reactivates the on mode of the power driver and the lamp starts burning. This happens without any renegotiation so there will be low delay time until the PDs can be supplied again with full power.

In a beneficial embodiment the communication and control hardware was only at a low consumption mode and can be used in either operational mode (stand-by as well as normal operation). Then no reboot and no new establishing of communication are required after stand-by.

In the first embodiment shown in FIG. 6, the PSE 1 monitors the communication to the PD (not shown). The PD can signal by communication packets (e.g. LLDP) that it now is going into idle state and no longer requires full power. The PSE 1 switches the supply for the related port from $V_{PoE}$ to $V_{STB}$. As the PD is fully available for communication it can itself detect that it has to leave standby mode and can signal that with a dedicated communication packet towards the PSE. The PSE turns $V_{PoE}$ on again. As depicted in FIG. 5 the PSE output voltage may need some short time to rise to the normal operation voltage.

In the present embodiment $V_{STB}$ is generated by means of a separate high efficiency stand-by supply section 115, even though it is also possible to use a single power supply section adapted to provide $V_{PoE}$ and $V_{STB}$ is a suitable (and preferably efficient) way.

The stand-by management system 113 is additionally linked by means of a deactivation signal line 111 to the power supply section 110, so the power supply section 110 can be deactivated whenever all ports of the PSE 1 are in stand-by mode and no $V_{PoE}$ is required. In this way only the high efficient standby supply section 115 needs to be operating during those periods of time.

Figure 7:
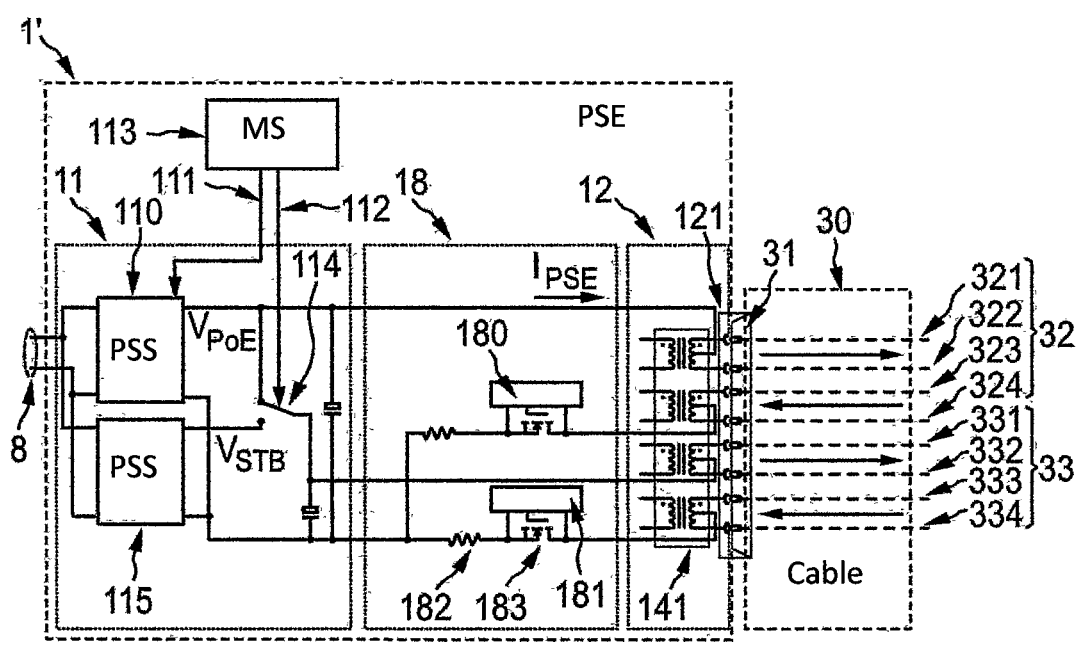
FIG. 7 shows a diagram illustrating a power supply circuitry in a PSE in accordance with another embodiment of the invention.

FIG. 7 shows a diagram illustrating a power supply circuitry in a PSE in accordance with another embodiment of the invention.

The PSE 1 shown in FIG. 7 mostly corresponds to the PSE 1 shown in FIG. 6. In the case of FIG. 7, however, power is provided by means of two pair set 32, 33 (see also FIG. 3). In contrast to the situation shown in FIG. 3, the power over the two pair sets 32, 33 in of a 4-Pair PoE system is different during stand-by. The PSE 1 will put the standby voltage ($V_{STB}$ in the range of 5.5 to 6.5 V) only on 1 pair set and the normal PoE voltage ($V_{PoE}$ in the range of 42.5 to 57 V) on the other.

As shown in FIG. 7, the connection between the power supply unit 11 and the plurality of cable connectors 31 of the jack 121 is provided such that the full PoE voltage is always supplied over pair set 32 and on the other pair set 33 the low stand-by support voltage is made available during stand-by mode. This allows PD designers taking whichever voltage level is best for high efficient PD operation and simple PD design. It is clear that power supply efficiency in the PSE will be higher at low power levels for the stand-by supply level than for the normal PoE voltage level.

In a modification (not shown) the PSE may choose to only switch the second pair to full PoE voltage when Type 3 or 4 power classes above 25.5 W are requested by the PD. The PD can signal its compatibility with this split voltage scheme by drawing minimally MPS (Maintain Power Signature) current on both pairs which a normal double bridge PD as shown would not do, where only the pair set with higher voltage would draw current.

Figure 8:
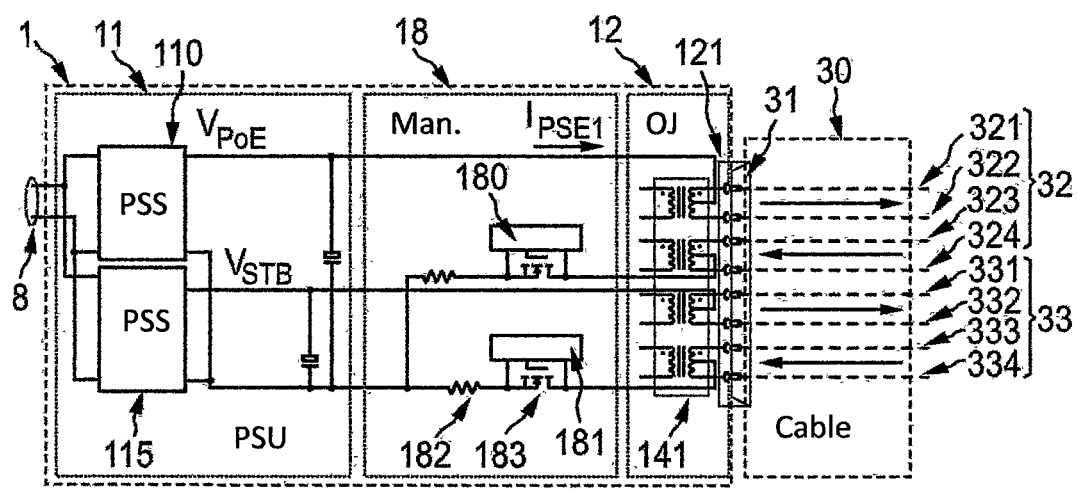
FIG. 8 shows a diagram illustrating a power supply circuitry in a PSE in accordance with another embodiment of the invention.

FIG. 8 shows a diagram illustrating a power supply circuitry in a PSE in accordance with another embodiment of the invention.

In embodiment shown in FIG. 8, the PSE 1 provides the standby voltage on a first pair set 33 permanently and the normal PoE voltage on the other pair set 22. In this case, on pairset 32 the full PoE voltage ($V_{PoE}$ in the range of 42.5 to 57 V) is supplied and on the other pairset 33 the low standby support voltage ($V_{STB}$ in the range of 5.5 to 6.5 V) is made available. This gives permanently better performance as the auxiliary small voltages in the PD can always be supplied from this lower voltage at higher DC/DC conversion efficiency.

The difference between the embodiments shown in FIGS. 7 and 8 is, in other words, the provision of a switching between $V_{STB}$ and $V_{PoE}$ for pair set 33 in the case of FIG. 7 together with the stand-by management system 113, while this switching is not provided in the case of FIG. 8.

Figure 9:
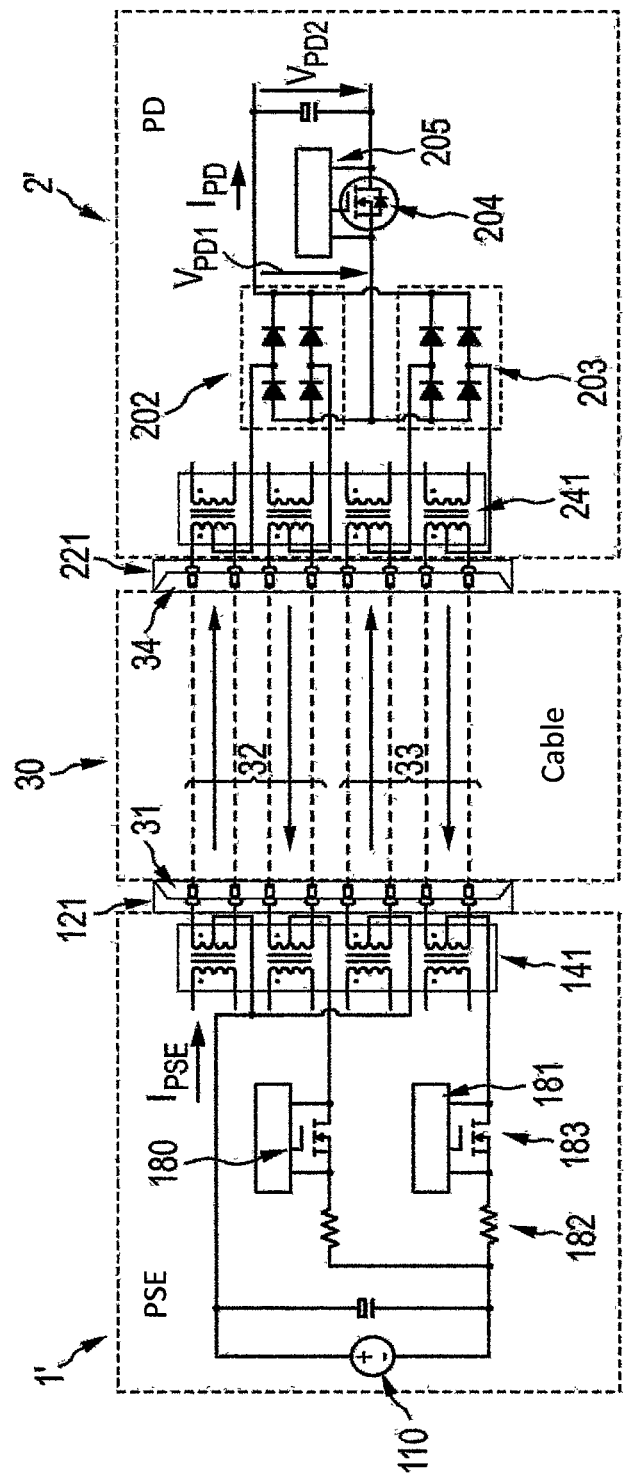
FIG. 9 illustrates a known non-split voltage connection between a PSE and a PD in the 4-pair context.

FIG. 9 illustrates a known non-split voltage connection between a PSE and a PD in the 4-pair context.

The PSE 1' corresponds to the PSE 1 shown in FIG. 3. The conventional PD 2' coupled to the PSE 1' by means of the cable 30 includes cable connectors 34 in a jack 221 of the PD 2', coupling transformers 24, input rectifier diodes 202, 203, an isolation switch 204 and a controller 205. Such rectifier diodes 202, 203 provided in conventional or legacy PDs allow the PDs to work on such a split voltage supply as discussed above with respect to FIGS. 7 and 8 as the higher of both pair set voltages would get connected through and $V_{STB}$ would be ignored.

The cable 30 used in PoE is in the simplest case a pre-manufactured cable with connectors 31, 34 on both sides. It gets fitted into the Ethernet jack 121 on the PSE side and the Ethernet jack 221 on the PD side. As indicated above, on the PD side two bridges of diodes 202, 203 connect to both pair sets 32, 33. A single PD interface circuit formed by the controller 205 and the isolation switch 204 is responsible for PoE negotiation. The output voltage of this is $V_{PD2}$ which is roughly the voltage of the pair set with higher voltage. Typically a voltage regulator (not shown) will follow to stabilize the internal PD voltage $V_{PD}$.

Figure 10:
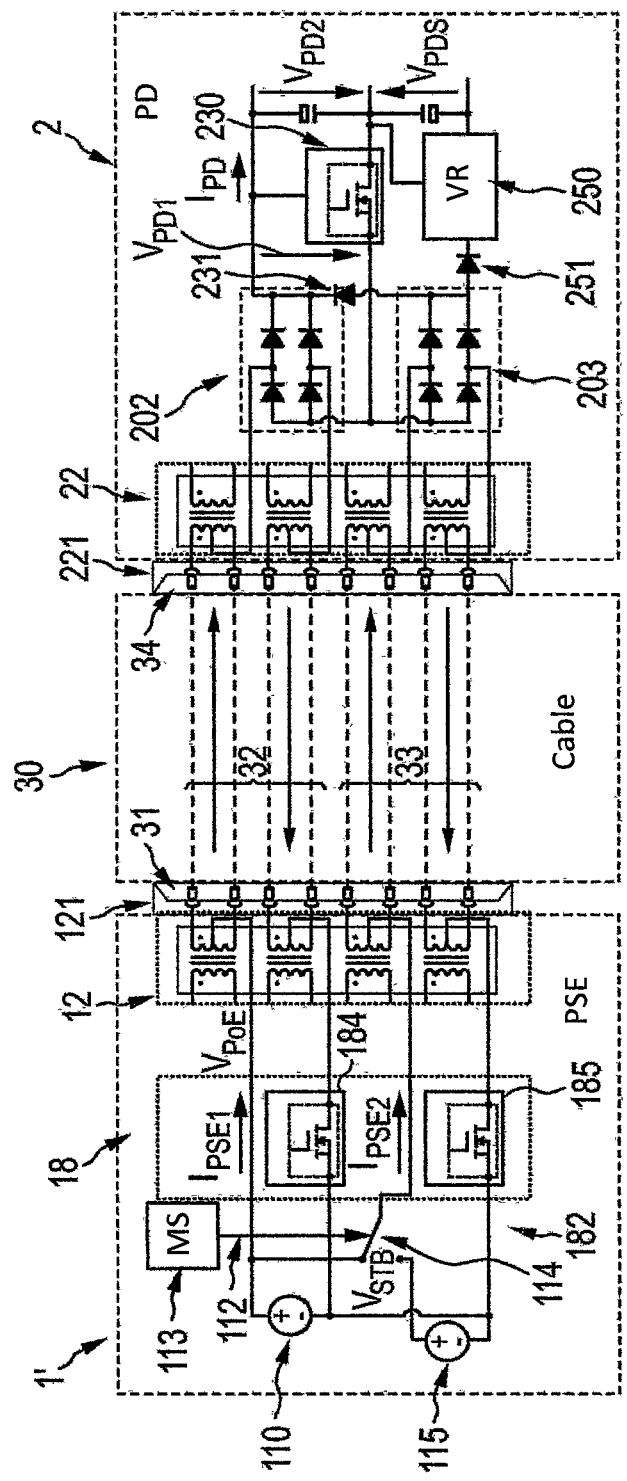
FIG. 10 illustrates a connection between a PSE and a PD in the 4-pair context in accordance with another embodiment of the invention.

FIG. 10 illustrates a connection between a PSE and a PD in the 4-pair context in accordance with another embodiment of the invention, in contrast to the conventional system of FIG. 9.

As discussed above with respect to FIG. 7 (showing a corresponding PSE 1, except for the provision of two PSE managing units 184, 185), two different voltages are placed on either pair set 32, 33. In this example, on pair set 32, the full PoE voltage level (42.5 to 57 V) is provided, while selectively the lower stand-by voltage level (5.5 to 6.5 V) is provided on pair set 33.

On the side of the PD 2 (here shown as including a PD negotiation and isolation circuit 230), the circuitry is enhanced in comparison to the case of FIG. 9 in being able to pick the high full PoE voltage from either pair. But by means of decoupling devices (here depicted as diodes 231 and 251) it is possible to connect also to the lower voltage on the second pair set 33. Further a voltage regulator (VR) 250 is provided which generates the internal low voltage supply from either $V_{PoE}$ or $V_{STB}$.

Figure 11:
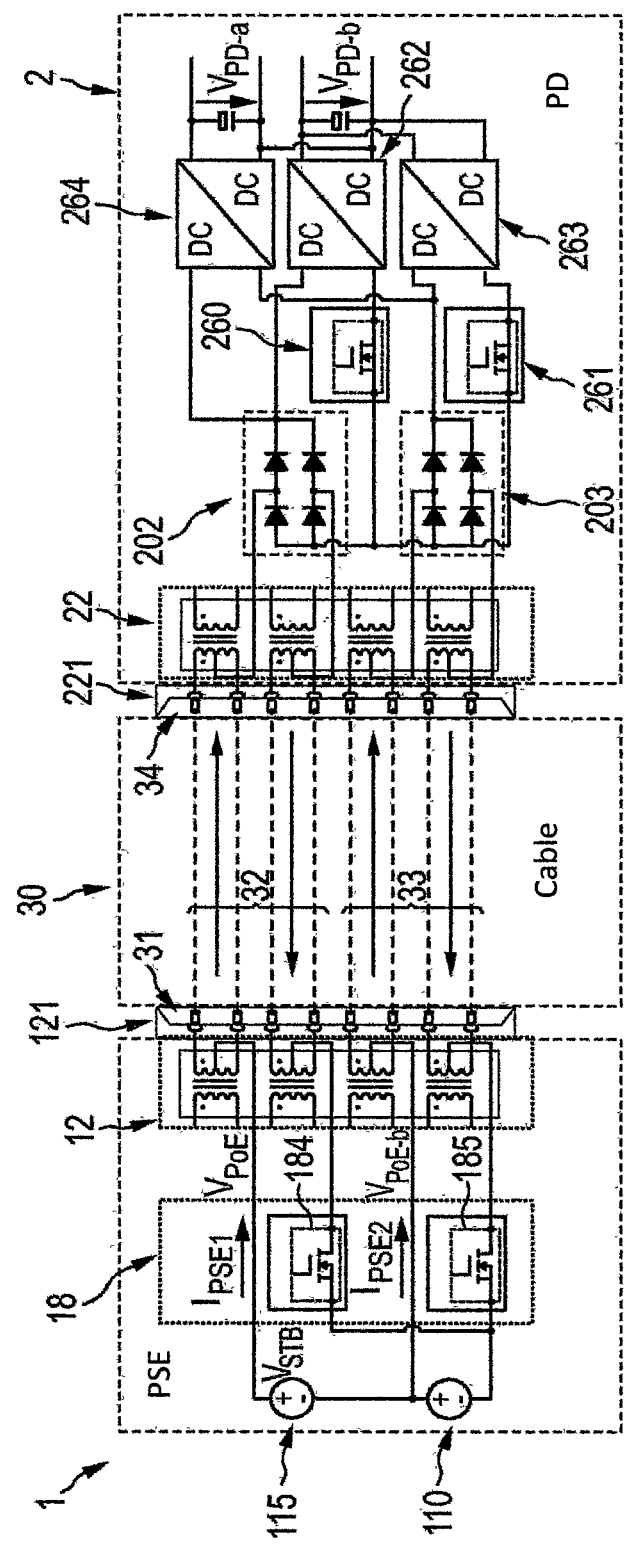
FIG. 11 illustrates a connection between a PSE and a PD in the 4-pair context in accordance with another embodiment of the invention.

FIG. 11 illustrates a connection between a PSE and a PD in the 4-pair context in accordance with another embodiment of the invention.

The internal topography of the PSE 1 shown in FIG. 11 largely corresponds to that shown in FIG. 8 (similar to the relation between the PSE shown in FIGS. 7 and 10). In this case, however, the power supply unit 110, 115 are provided in series, so that the two voltages on the two pair sets are both in the full PoE voltage range (42.5 to 57 V). However, the difference of the voltages corresponds to $V_{STB}$ (in being in the range of 5.5 to 6.5 V).

On the side of the PD 2, an isolated DC/DC converter 264 is used to get this difference voltage to the ground reference level of the PD circuitry supplying the controller. This embodiment may be used beneficially with two separate PD controllers 260, 261 (one for each pair set) and two voltage regulators 262, 263 in order to load the two pair sets 32, 33 equally under normal operation conditions. For the PSE 1 such a PD 2 may be called a dual signature PD where the negotiation is done independently for each pair set 32, 33.

As shown in FIG. 11, the PSE side two different voltages $V_{PoE-a}$ and $V_{PoE-b}$ are connected to the two pair sets 32, 33 with $V_{PoE-a}=V_{PoE-b}+V_{STB}$. On the PD side the two different voltages get handled by the different rectifier bridges 202, 203 and DC/DC converters 262, 263 in order to balance the load evenly with different voltage levels and keep both circuits (completely) decoupled. Here preferably two separate PD negotiation and isolation circuits 260, 261 are provided. A separate DC/DC converter 264 converts the voltage difference between the pair sets 32, 33 into the standby circuit. In FIG. 11 all three DC/DC converters 262, 263, 264 are shown as isolated converters in order to get all circuits completely decoupled.

As in this embodiment one pair set (the set with the lower voltage) will be loaded with a negative current during stand-by the rules for MPS have to be adapted in order to keep both voltages on when the MPS condition (current above the PoE defined MPS current) is reached only on the pair set with higher voltage. An alternative/modification is to also look for negative current and decide when this is above MPS to keep the voltage on.

Figure 12:
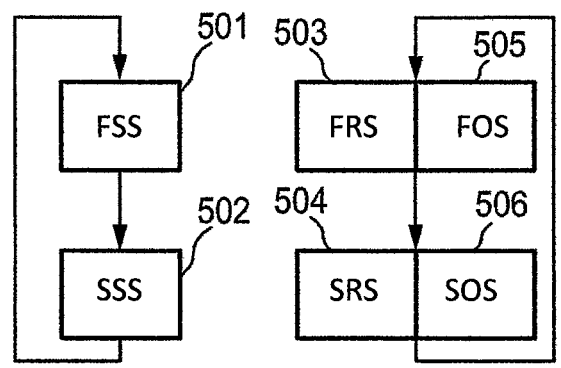
FIG. 12 shows a flow diagram of a process in accordance with another embodiment of the invention.

FIG. 12 shows a flow diagram of a process in accordance with another embodiment of the invention.

In the context of the method of providing power from a power providing device to a power receiving device as shown in FIG. 12, the power providing device is arranged for providing power to multiple power receiving device, wherein the power receiving device is arranged to operate in a first mode and in a second mode On the side of the power providing device, in a first supply step (FSS) 501, power is supplied, by the power providing device, at a first voltage.

On the side of the power receiving device, the power at the first voltage is received in a first receiving step (FRS) 503, wherein correspondingly, the operation of the power receiving device is provided in a first operation step (FOS) 505 (or first mode step).

Eventually, by the power providing device, in a second supply step (SSS) 502, power is provided at a second voltage, after supplying power at the first voltage during the first supply step 501, wherein the first voltage is higher than the second voltage.

Correspondingly, by the power receiving device, the power is received in a second receiving step (SRS) 504 at the second voltage. Further, in the second operation step (SOS) 506, the power receiving device is operating in the second mode after switching to from operating in the first mode to operating in the second mode upon receiving power at the second voltage after receiving power at the first voltage.

After respective steps 502, 504, 506, the process may return back to steps 501, 503, 505, e.g. in case of the first mode being a regular operation mode and the second mode being a stand-by mode, which eventually is cancelled and operation is return to regular (e.g. full power) operation.

In one embodiment, the present invention provides for a DC distribution system allowing for providing standby assistance low voltage allowing for increased efficiency operation. In a modification thereof, the DC distribution voltage is stepping down from normal supply voltage level to a stand-by mode supply voltage level wherein the power supply controls the mode change. Preferably the power distribution is done via power over Ethernet PoE. In a modification, a separate standby supply is an integral part of the PSE power supply unit. In a further modification, a switch to lower voltage supply is provided on a number of conductors while other conductors are kept on normal operation voltage. In an implementation, the main supply is switched off when all channels of a PSE operate in stand-by. In a corresponding system MPS is used to detect legacy (non stand-by prepared) PDs being connected wherein these legacy devices will fail consuming MPS when supplied with standby supply voltage. Specifically, legacy (non stand-by prepared) PDs may get only powered up when a new packet for the PD is detected (meaning that renegotiation is paused for that period of time). After powering up the stored packet gets retransmitted to the PD. The invention provides for a method of automatically triggering stand-by mode by means of observing the current drawn by the load connected to a PSE port, a method of triggering stand-by in combination with the overall system control, e.g. by monitoring and parsing commands towards the load devices, and/or a method of ending stand-by in combination with the overall system control system e.g. by monitoring and parsing commands towards the load devices which are in stand-by mode.

In the preceding detailed description of embodiments similar or corresponding reference signs are used for corresponding or identical elements of different embodiments and discussions provided with respect to one embodiment or example are to be understood as applying also to other corresponding embodiments, unless indicated or apparent otherwise.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single processor, device or other unit may fulfill the functions of several items recited in the claims. The mere fact that certain measures are recited in mutually different dependent claims does not indicate that a combination of these measures cannot be used to advantage.

Operations like enabling or disabling, controlling and switching can be implemented as program code means of a computer program and/or as dedicated hardware.

A computer program may be stored and/or distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A system comprising:
a power providing device configured to provide power to multiple receiving devices and having a power supply unit, and
a power receiving device having a power reception control unit, the power reception control unit being configured to control the power receiving device to operate selectively in a first mode and in a second mode;
wherein the power supply unit is configured to supply power to the power receiving device at a first voltage on first conductors coupled between the power providing device and the power receiving device and at a second voltage on second conductors coupled between the power providing device and the power receiving device, the first voltage is higher than the second voltage, the first conductors are different from the second conductors, the power reception control unit is configured to control the power receiving device to operate in the first mode upon receiving power at the first voltage and to operate in the second mode upon receiving power at the second voltage, and the power providing device is configured such that the second voltage is supplied after the first voltage, and
wherein the power receiving device is configured to provide power to the power reception control unit by converting the first and second voltages into a third voltage, the third voltage corresponds to a difference between the first voltage and the second voltage, and the power reception control unit is configured to control the power receivingg device to operate in the second mode when the power reception control unit receives the third voltage.

2. The system according to claim 1, wherein the power supply unit is configured to supply power to the power receiving device using the second conductors selectively either at the first voltage or at the second voltage.

3. The system according to claim 1, wherein the power supply unit is configured to provide power to the power receiving device selectively either at the first voltage or at the second voltage.

4. The system according to claim 1, wherein the power supply unit includes a first power supply for supplying power at the first voltage and a second power supply for supplying power at the second voltage.

5. The system according to claim 4, wherein the power providing device is arranged for disabling the first power supply in case power is provided to all power receiving devices receiving power from the power providing device at the second voltage.

6. The system according to claim 4, further comprising a power provision control unit arranged to control the power supply unit by switching between the first power supply and the second power supply.

7. The system according to claim 1,
wherein the power providing device is a power sourcing equipment according to a Power over Ethernet standard,
wherein the power receiving device is a powered device according to the Power over Ethernet standard.

8. The system according to claim 1, wherein the power providing device is configured to detect that the power receiving device is entering into the second mode, and in response to the detection, the power providing device is configured to continue to supply power at the first voltage to the power receiving device for an idle lockout period before switching from supplying power at the first voltage to supplying power at the second voltage.

9. A power receiving device arranged for being provided with power by a power providing device, comprising:
a power receiving unit configured to receive power from the power providing device at a first voltage and at a second voltage, the first voltage being higher than the second voltage, and
a power reception control unit configured to control the power receiving device to operate in a first mode and in a second mode,
wherein the power reception control unit is configured to control the power receiving device to operate in the first mode upon receiving power at the first voltage on first conductors coupled between the power providing device and the power receiving device, and is further configured to control the power receiving device to switch from operating in the first mode to operating in the second mode upon receiving power at the second voltage on second conductors coupled between the power providing device and the power receiving device after receiving power at the first voltage, wherein the second conductors are different from the first conductors, and
wherein a difference between the first voltage and the second voltage corresponds to a third voltage, the power receiving unit is configured to supply power to at least the power reception control unit by converting the first and second voltages into the third voltages, and the power reception control unit is configured to control the power receiving device to operate in the second mode when the power reception control unit receives the third voltage.

10. The power receiving device according to claim 9,
wherein a power consumption of the power receiving device in the second mode is less than a power consumption of the power receiving device in the first mode,
wherein the power reception control unit is configured to control the power receiving device to switch from operating in the second mode to operating in the first mode upon receiving power at the first voltage after receiving power at the second voltage.

11. The power receiving device according to claim 9, wherein the power receiving device is configured to inform the power providing device that the power receiving device is entering into the second mode, and in response to the informing, the power receiving device is configured to continue to receive power at the first voltage from the power providing device for an idle lockout period before receiving power at the second voltage.

12. A method of providing power from a power providing device to a power receiving device, the power providing device configured to provide power to multiple receiving devices, the power receiving device configured to operate in a first mode and in a second mode, the method comprising the steps:
supplying power, by the power providing device, at a first voltage on first conductors coupled between the power providing device and the power receiving device,
receiving power, by the power receiving device, at the first voltage on the first conductors,
supplying power, by the power providing device, at a second voltage on second conductors coupled between the power providing device and the power receiving device, after supplying power at the first voltage, the first voltage being higher than the second voltage, and the second conductors being different from the first conductors,
receiving power, by the power receiving device, at the second voltage on the second conductors, and
supplying power, by the power receiving device, to a power reception control unit by converting the first and second voltages into a third voltage, the third voltage corresponding to a difference between the first voltage and the second voltage, the power reception control unit controlling the power receiving device to operate selectively in the first mode and in the second mode, and the power reception control unit controlling the power receiving device to operate in the second mode when the power reception control unit receives the third voltage,
wherein the power receiving device is operating in the first mode upon receiving power at the first voltage on the first conductors and switches from operating in the first mode to operating in the second mode upon receiving power at the second voltage on the second conductors after receiving power at the first voltage on the first conductors.

13. The method of claim 12, further comprising:
detecting, by the power providing device, that the power receiving device is entering into the second mode; and
in response to the detecting, continuing to supply power, by the power providing device, at the first voltage to the power receiving device for an idle lockout period before switching from supplying power at the first voltage to supplying power at the second voltage.

* * * * *